(12) United States Patent
Drake et al.

(10) Patent No.: US 11,169,273 B2
(45) Date of Patent: Nov. 9, 2021

(54) SYSTEMS AND METHODS FOR OBTAINING A LOCATION OF AN APPLIANCE

(71) Applicant: Haier US Appliance Solutions, Inc., Wilmington, DE (US)

(72) Inventors: Jeff Donald Drake, Louisville, KY (US); Irena J. McDowell, Louisville, KY (US); Chad Michael Helms, Louisville, KY (US); Arnold Estravillo, Mt. Washington, KY (US); William Everette Gardner, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 396 days.

(21) Appl. No.: 16/275,412

(22) Filed: Feb. 14, 2019

(65) Prior Publication Data

US 2020/0264314 A1 Aug. 20, 2020

(51) Int. Cl.
  *G01S 19/14* (2010.01)
  *G01S 19/25* (2010.01)
  *H04L 12/28* (2006.01)

(52) U.S. Cl.
  CPC .............. *G01S 19/14* (2013.01); *G01S 19/25* (2013.01); *H04L 12/2807* (2013.01)

(58) Field of Classification Search
  CPC ....... G01S 19/14; G01S 19/25; H04L 12/2807
  USPC ................................................... 342/357.52
  See application file for complete search history.

(56) References Cited

U.S. PATENT DOCUMENTS

| | | | |
|---|---|---|---|
| 2002/0156556 A1* | 10/2002 | Ruffner | G01S 5/02 701/23 |
| 2006/0009152 A1* | 1/2006 | Millard | H04W 4/029 455/12.1 |
| 2013/0247117 A1* | 9/2013 | Yamada | G08C 17/02 725/93 |
| 2014/0250183 A1* | 9/2014 | Unagami | H04L 12/2809 709/204 |
| 2015/0126126 A1* | 5/2015 | Lee | H04W 4/80 455/41.3 |
| 2015/0269825 A1* | 9/2015 | Tran | A61B 5/7225 340/539.12 |

(Continued)

FOREIGN PATENT DOCUMENTS

JP 2005025337 A 1/2005

*Primary Examiner* — Harry K Liu
(74) *Attorney, Agent, or Firm* — Dority & Manning, P.A.

(57) ABSTRACT

Systems and methods for obtaining a location of an appliance are provided. In particular, the systems and methods include features for automatically obtaining a location of an appliance, e.g., for registration purposes. In one example aspect, a system includes an appliance that includes features for providing a local appliance network, a user device for connecting to the local appliance network, and a remote computing device communicatively coupled with the user device. To obtain the location of the appliance, the user device first connects with the local appliance network. The user device then obtains data indicative of the geographic location of the user device while connected to the appliance network and routes the data to the remote computing device. As the range of the local appliance network is limited, the location of the user device while connected to the local appliance network is assumed as the geographic location of the appliance.

20 Claims, 5 Drawing Sheets

(56) References Cited

U.S. PATENT DOCUMENTS

2016/0073259 A1    3/2016  Lee et al.
2018/0092011 A1*  3/2018  Lin .................. H04W 36/14
2018/0321652 A1* 11/2018  Jablokov ............ G05B 19/042
2019/0206411 A1*  7/2019  Li ........................ G06F 3/167

* cited by examiner

SYSTEMS AND METHODS FOR OBTAINING A LOCATION OF AN APPLIANCE

FIELD OF THE INVENTION

The subject matter of the present disclosure relates generally to appliances, and more particularly to systems and methods for obtaining a location of an appliance, e.g., for registration purposes.

BACKGROUND OF THE INVENTION

Registration of an appliance (e.g., a dishwasher, washing machine appliance, dryer appliance, oven appliance, etc.) with a manufacturer can provide numerous benefits and advantages. For example, when a consumer registers his or her appliance with a manufacturer, the manufacturer can more efficiently service the appliance and can provide product updates and safety information to the consumer, among other benefits and advantages. Conventionally, to register an appliance, consumers have had to fill out a registration card provided by the manufacture and then return the card to the manufacturer. Certain information can be collected on the registration card, such as the consumer's name, contact information, and address. In some instances, consumers are offered the option of registering their appliance online. However, many consumers fail to register their appliances and thus the benefits and advantages of registering an appliance are not realized.

Accordingly, improved methods and systems that address one or more of the challenges noted above would be useful.

BRIEF DESCRIPTION OF THE INVENTION

Aspects and advantages of embodiments of the present disclosure will be set forth in part in the following description, or may be learned from the description, or may be learned through practice of the embodiments.

In a first exemplary embodiment, a method for obtaining a geographic location of an appliance is provided. The method includes connecting a user device to a local appliance network provided by the appliance. The method also includes obtaining, via the user device, data indicative of the geographic location of the connected user device. Further, the method includes providing, via the user device, the obtained data indicative of the geographic location of the connected user device to a remote computing device, wherein the obtained data indicative of the geographic location of the connected user device is indicative of the geographic location of the appliance.

In a second exemplary embodiment, a system is provided. The system includes an appliance having a network module for providing a local appliance network. The system also includes a user device connected with the local appliance network, the user device having a location module for obtaining data indicative of a geographic location of the user device while the user device is connected to the local appliance network. Further, the system includes a remote computing device communicatively coupled with the user device, wherein the remote computing device receives, from the user device, the data indicative of the geographic location of the user device while the user device is connected to the local appliance network. Moreover, the data indicative of the geographic location of the user device while the user device is connected to the local appliance network is indicative of a geographic location of the appliance.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is noted that, for the purposes of the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 1:
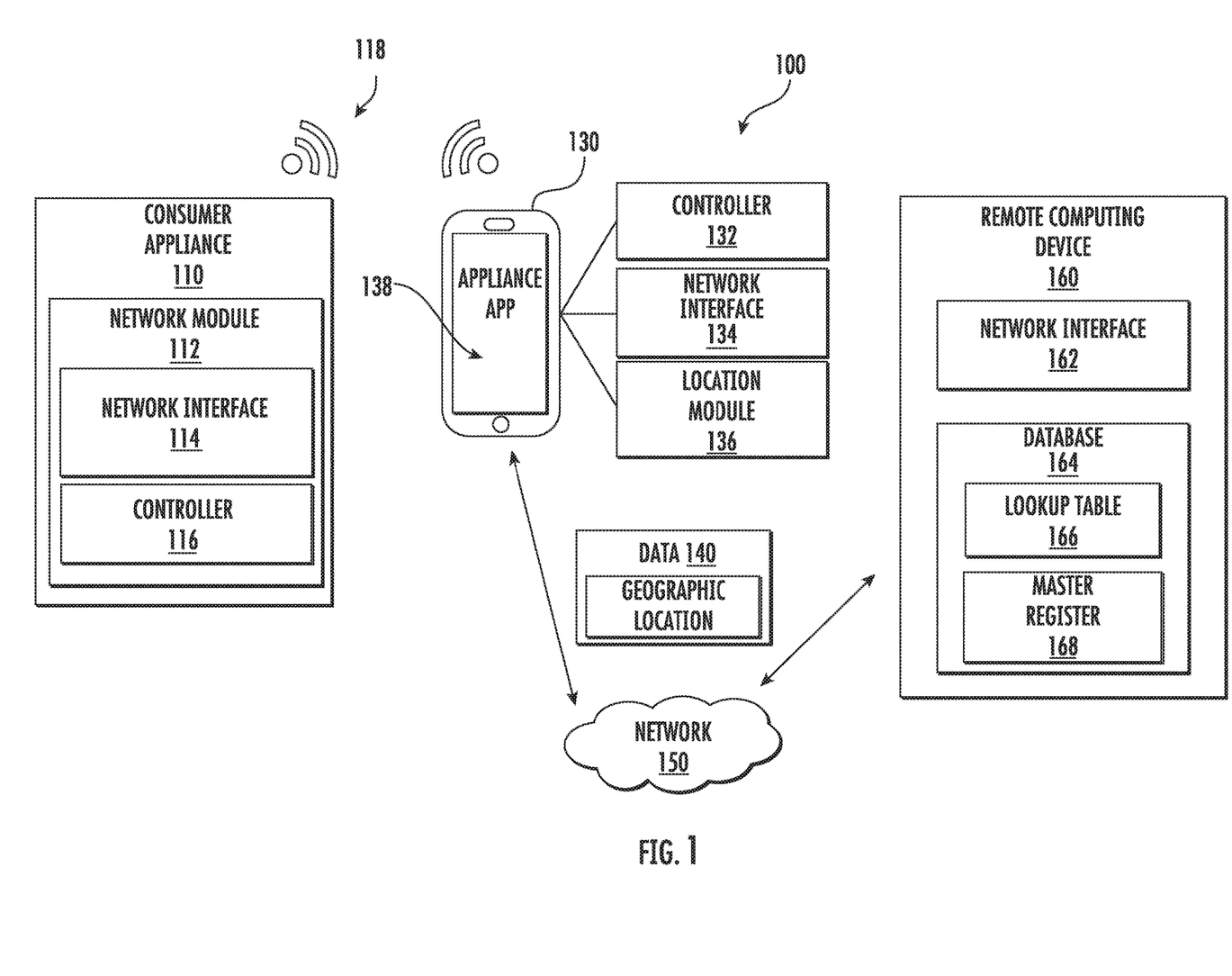
FIG. 1 provides a schematic view of an exemplary system according to exemplary embodiments of the present disclosure.

FIG. 1 provides a schematic view of a system 100 according to an exemplary embodiment of the present disclosure. As depicted, system 100 includes an appliance 110, a user device 130, and a remote computing device 160. Collectively, these components function to automatically determine or obtain a geographic location of appliance 110. Knowing the geographic location of appliance can be useful for many purposes. For instance, the physical address of the appliance can be determined based at least in part on the geographic location of the appliance. Knowing the physical address at which the appliance is located can assist service professionals with locating and more efficiently servicing appliances. Further, the determined geographic location of an appliance can be used for registering the appliance to a particular user. Moreover, the determined geographic location of the appliance can be used for data analytics, among other possible uses. The system and methods described herein provide a low cost and efficient solution for determining a geographic location of an appliance whilst being mindful of a consumer's privacy.

As shown in FIG. 1, system 100 includes appliance 110. Appliance 110 can be any suitable type of "connected" appliance. For instance, appliance 110 can be a connected washing machine appliance, dryer appliance, microwave appliance, oven appliance, cooktop appliance, range appliance, water heater appliance, dishwasher appliance, refrigerator appliance, freezer appliance, icemaker appliance, or kitchen hub cooking system. As used herein, a "connected" appliance is an appliance that includes features for providing a local appliance network (e.g., a Bluetooth network) so that users can connect one or more electronic user devices thereto.

Appliance 110 includes a network module 112 for providing a local appliance network 118. Network module 112 of appliance 110 has a network interface 114 and a controller 116 that provides functionality to network module 112. Generally, network interface 114 of appliance 110 provides a means for various user devices to connect to appliance network 118 provided by appliance 110, or more particularly, network module 112 of appliance 110. Network interface 114 can include any suitable components for interfacing with appliance network 118. For example, network interface 114 can include transmitters, receivers, ports, antennas, or other suitable components for interfacing with appliance network 118 of appliance 110. In some embodiments, network interface 114 is an onboard component of controller 116. In alternative embodiments, network interface 114 is an offboard component of controller 116. Network interface 114 can establish communication with one or more networks in any suitable manner, e.g., via a wired or wireless communication link, and with any suitable protocol. For instance, in some embodiments, network interface 114 includes an RF radio operable to provide a wireless access point to appliance network 118 of appliance 110. As one example, network interface 114 can include an 802.11n 2.4 GHz Wi-Fi radio. Network interface 114 can include suitable hardware for interfacing with other wireless network types as well, such as e.g., Wi-Fi networks generally (IEEE 802.11 networks), ZigBee (IEEE 802.15-4), Bluetooth Low Energy (LE), and Bluetooth Mesh. Thus, in some embodiments, local appliance network 118 of appliance 110 is a wireless network. Generally, local appliance network 118 provided by appliance 110 has a limited geographic range or connectable radius in which user devices can connect to local appliance network 118. For instance, in some embodiments, a range or connectable radius of the wireless local appliance network 118 is less than about 100 feet 30 meters). In yet other embodiments, a range or connectable radius of the wireless local appliance network 118 is less than about 150 feet 46 meters). In further embodiments, a range or connectable radius of the wireless local appliance network 118 is less than about 50 feet 15 meters). Accordingly, when a user connects his or her user device 130 to appliance network 118, it is ensured that user device 130 is proximate appliance 110.

Additionally or alternatively, in some embodiments, appliance network 118 of appliance 110 is a wired network. That is, in addition or alternatively to connecting wirelessly with appliance network 118, a user may connect his or her user device 130 to appliance network 118 of appliance 110 via a wired connection.

In some embodiments, controller 116 of network module 112 includes one or more processors and one or more memory devices. The processor(s) of controller 116 can be any suitable processing device, such as a microprocessor, microcontroller, integrated circuit, or other suitable processing device. The memory device(s) of controller 116 can include any suitable computing system or media, including, but not limited to, non-transitory computer-readable media, RAM, ROM, hard drives, flash drives, or other memory devices. The memory of controller 116 can store information accessible by processor(s) of controller 116, including instructions that can be executed by processor(s) of controller 116 in order to provide functionality to network module 112. For instance, controller 116 can execute one or more software applications or control logic for certain functionality operations, e.g., maintaining hardware status, serving as a control register, providing commands to connected user devices, acting as a linking manager, etc. Controller 116 is communicatively coupled with network interface 114.

As further shown in FIG. 1, system 100 includes user device 130. User device 130 is selectively communicatively coupled with or connected to the appliance network 118 of or provided by appliance 110. For instance, in some embodiments, user device 130 can connect to appliance network 118 wirelessly. Additionally or alternatively, user device 130 can connect to appliance network 118 by a wired connection. Further, user device 130 is selectively communicatively coupled with or connected to other networks, such as e.g., network 150. User device 130 includes a processing device or controller 132, a network interface 134, a location module 136, and a user interface 138. User device 130 can be any suitable type of device capable of connecting with local appliance network 118 provided by appliance 110 and having a location module, e.g., a GPS module. For example, user device 130 can be a personal computing device (e.g., laptop or desktop), a mobile computing device (e.g., smartphone, tablet, smartwatch), a gaming console or controller, a wearable computing device, an embedded computing device, a remote, or any other suitable type of user computing device. For this embodiment, user device 130 is a smartphone having a GPS module as location module 136. Although one user device is shown in FIG. 1, system 100 can include multiple or a plurality of user devices.

Controller 132 of user device 130 can include one or more processors and one or more memory devices, and provides user device 130 functionality. The processor(s) of controller 132 can be any suitable processing device, such as a microprocessor, microcontroller, integrated circuit, or other suitable processing device. The memory device(s) of controller 132 can include any suitable computing system or media, including, but not limited to, non-transitory computer-readable media, RAM, ROM, hard drives, flash drives, or other memory devices. The memory of controller 132 can store information accessible by processor(s) of controller 132, including instructions that can be executed by processor(s) of controller 132 in order to operate various components of user device 130 to provide user device 130 functionality. Controller 132 is communicatively coupled with various operational components of user device 130, such as e.g., user interface 138, network interface 134, and location module 136. User interface 138 of user device 130 can include a touch screen and/or one or more buttons. Input/output ("I/O") signals may be routed between controller 132 and user interface 138, network interface 134, and location module 136 (as well as other operational components of user device 130), e.g., via an integrated control board of user device 130. Controller 132 can execute various applications, such as e.g., an "Appliance App", as shown in FIG. 1. The Appliance App can be specifically designed to control appliance 110 remotely, e.g., via a connection with appliance network 118. The Appliance App can be managed by a manufacturer of the appliance, for example.

Network interface 134 of user device 130 is operable to communicatively couple or connect user device 130 with various networks, such as e.g., appliance network 118 and network 150. Network interface 134 can include any suitable components for interfacing with one more networks. For example, network interface 134 can include transmitters, receivers, ports, controllers, antennas, or other suitable components for interfacing with appliance network 118 of appliance 110, network 150, and/or other networks. Network interface 134 can establish communication with a network in any suitable manner, e.g., via a wired or wireless communication link, and with any suitable protocol. Controller 132 can provide control functionality for network interface 134.

Location module 136 of user device 130 is operable to obtain data 140 indicative of a geographic location of user device 130. As one example, location module 136 can be a Global Positioning System (GPS) and can receive location or position information from a plurality of GPS satellites. Accordingly, data 140 can contain GPS coordinates of user device 130. Location module 136 can include various hardware and software known in the art for receiving data indicative of a geographic location of user device 130. For instance, location module 136 can include a GPS receiver. In some embodiments, location module 136 can automatically obtain data 140 indicative of the geographic location of user device 130 when user device 130 is connected to appliance network 118. In other embodiments, location module 136 can obtain data 140 indicative of the geographic location of user device 130 when user device 130 is connected to appliance network 118 and upon a user input.

As will be described in detail herein, once user device 130 is communicatively coupled with appliance network 118, location module 136 is operable to obtain data 140 indicative of the geographic location of user device 130. Once data 140 is received by user device 130, user device 130 can provide data 140 to remote computing device 160 (e.g., by automatically pushing, upon authorization by a user, or otherwise sending data 140 to remote computing device 160). Remote computing device 160 can receive data 140. As appliance network 118 is a local area network of appliance 110 itself (e.g., a wireless local area network) and has a limited range or connectable radius, data 140 indicative of the geographic location of user device 130 received by remote computing device 160 is also indicative of the geographic location of appliance 110. That is, the data 140 indicative of the geographic location of user device 130 when user device 130 is communicatively coupled with local appliance network 118 of appliance 110 is indicative of the geographic location of appliance 110. Accordingly, it can be assumed that the data 140 indicative of the geographic location of user device 130 received by remote computing device 160 is also indicative of the geographic location of appliance 110. As noted previously, knowing the geographic location of appliance 110 has many uses and benefits.

Network 150 can be any suitable type of network, such as a local area network (e.g., intranet), wide area network (e.g., internet), low power wireless networks, e.g., Bluetooth Low Energy (BLE), or some combination thereof and can include any number of wired or wireless links. In general, communication over network 150 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Remote computing device 160 (which can be one of a plurality of remote computing devices of a remote computing system) can be a remote or cloud server, for example. Remote computing device 160 can be managed by a manufacturer of the appliance, for instance. Remote computing device 160 can include one or more processors and one or more memory devices. The processor(s) of remote computing device 160 can be any suitable processing device, such as a microprocessor, microcontroller, integrated circuit, or other suitable processing device. The memory device(s) of remote computing device 160 can include any suitable computing system or media, including, but not limited to, non-transitory computer-readable media, RAM, ROM, hard drives, flash drives, or other memory devices. The memory of remote computing device 160 can store information accessible by processor(s) of remote computing device 160, including instructions that can be executed by processor(s) of remote computing device 160 in order to provide functionality to remote computing device 160. For instance, remote computing device 160 can execute one or more software applications or control logic schemes. Remote computing device 160 is communicatively coupled with user device 130, e.g., via network 150.

Remote computing device 160 also includes a network interface 162. Network interface 162 of remote computing device 160 is operable to communicatively couple remote computing device 160 with various networks, such as e.g., network 150. Network interface 162 of remote computing device 160 can include any suitable components for interfacing with one more networks. For example, network interface 162 can include transmitters, receivers, ports, controllers, antennas, or other suitable components for interfacing with network 150 and/or other networks. Network interface 162 can establish communication with a network in any suitable manner, e.g., via a wired or wireless communication link, and with any suitable protocol.

Remote computing device 160 receives, from the user device 130, data 140 indicative of the geographic location of user device 130 while the user device 130 is connected to the local appliance network 118 of appliance 110. As noted previously, the data 140 indicative of the geographic location of user device 130 when user device 130 is communicatively coupled with the local appliance network 118 of or provided by appliance 110 is indicative of a geographic location of appliance 110. Knowing the geographic location of appliance can be useful for many purposes. For instance, the physical address of the appliance can be determined based at least in part on the geographic location of the appliance, among other possible uses.

Figure 2:
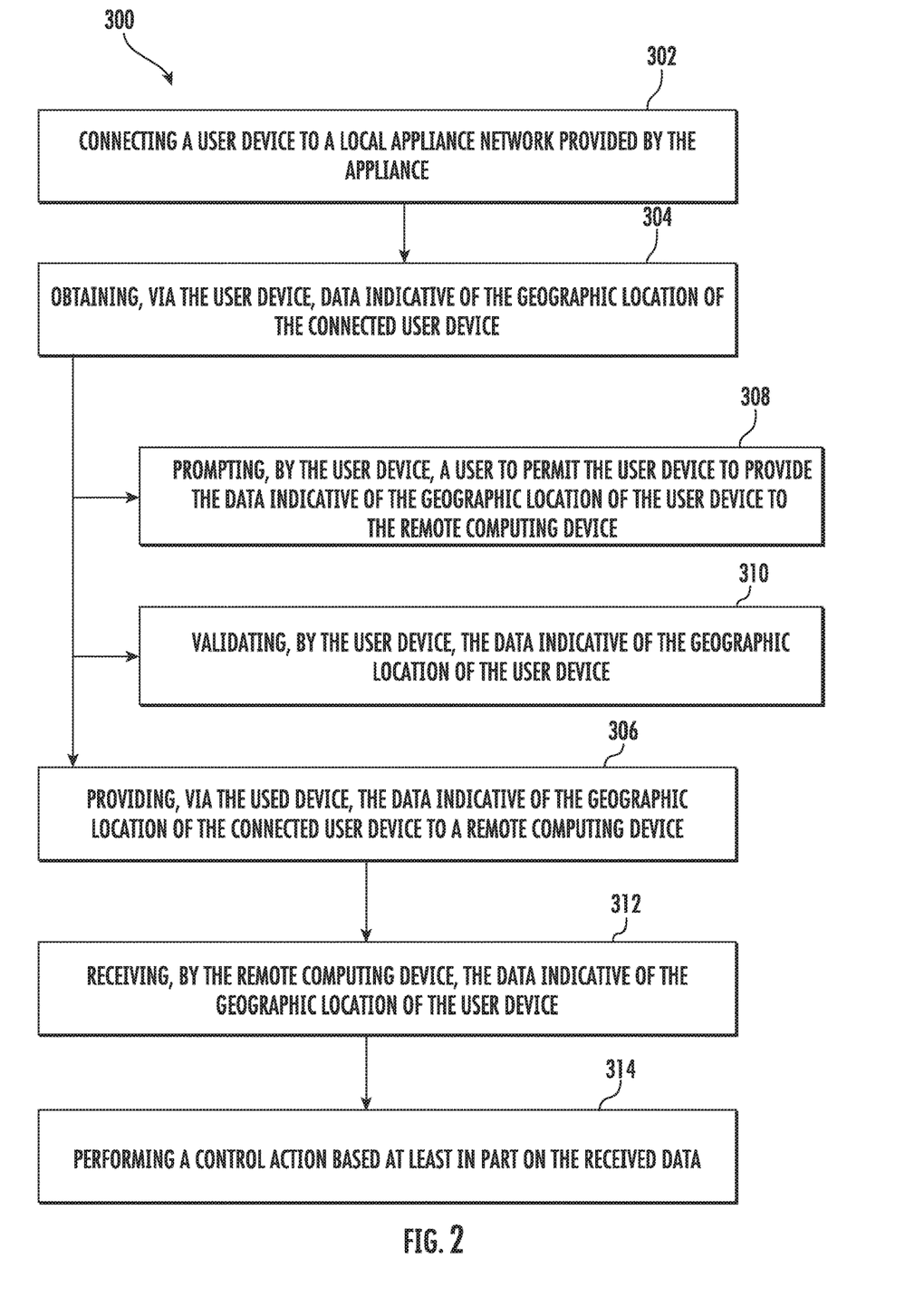
FIG. 2 provides a flow diagram of an exemplary method for obtaining a geographic location of an appliance according to an exemplary embodiment of the present disclosure.

FIG. 2 provides a flow diagram of an exemplary method (300) for obtaining a geographic location of an appliance according to an exemplary embodiment of the present disclosure. Method (300) can be implemented to obtain the geographic location of any suitable connected appliance. For instance, method (300) can be implemented by the various components of system 100 of FIG. 1. Accordingly, the reference numerals referring to the various features of system 100 of FIG. 1 will be used below to provide context to method (300).

At (302), the method (300) includes connecting a user device to a local appliance network of the appliance. That is, a user device (e.g., a smartphone) can be communicatively coupled with or to a local appliance network on or provided by the appliance, e.g., by a network module of the appliance. For instance, as shown in FIG. 1, network interface 134 of user device 130 can interface with network interface 114 of network module 112 to connect or communicatively couple user device 130 to local appliance network 118 provided by appliance 110, e.g., by network module 112. As one example, user device 130 can be connected to local appliance network 118 of appliance 110 via Bluetooth or another suitable wireless network type.

In some implementations, a user device can connect to a local appliance network provided by an appliance automatically, e.g., when the user device is within the local appliance network range. Additionally or alternatively, a user device can connect to a local appliance network provided by an appliance upon a user input, e.g., during the commissioning of the appliance. Thus, a user device can be connected with or to a local appliance network of an appliance during commissioning of the appliance. During commissioning of the appliance, the user device can obtain or otherwise receive identification information indicating an identity of the appliance, e.g., the appliance type, model number, details regarding select features of the appliance, an image version of the software loaded on the appliance control board, etc. The Appliance App can thus be configured to control the appliance via features that correspond to the appliance identified. The Appliance App, when downloaded and set up, can obtain information relating to the identity of the user of the appliance, e.g., the user's name or email address. Further, during commissioning, a user can utilize his or her user device to connect their home appliance to a home local network, e.g., a home or building wireless or wired network. The user may utilize a user device to pass the home local network credentials to the appliance to connect the appliance to the home local network. To accomplish this task, the appliance can provide the local appliance network, as will be explained further below. Accordingly, in some implementations, the method (300) can include commissioning, via the user device, the appliance to a home local network, wherein during commissioning, the user device obtains identification information indicating an identity of the appliance and an identity of a user of the appliance.

Figure 3:
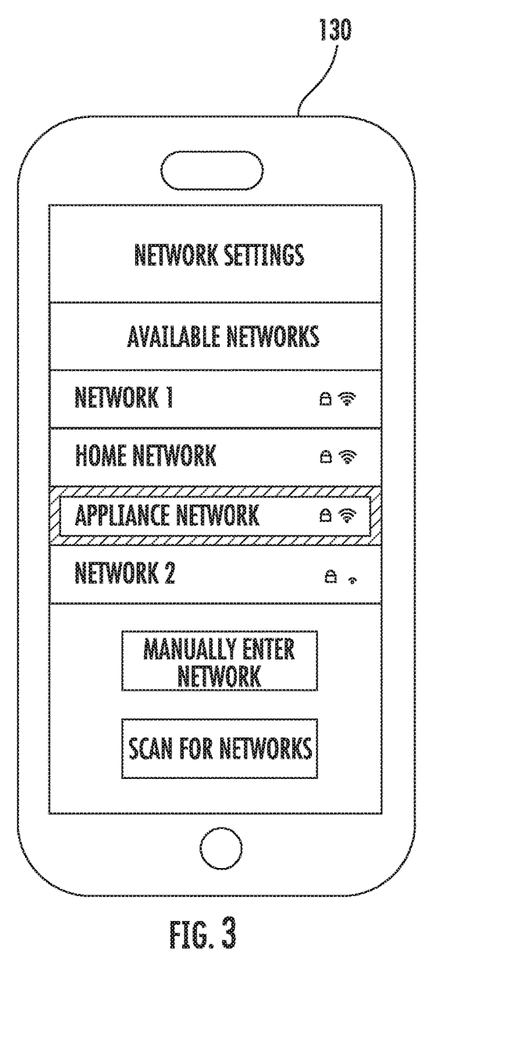
FIGS. 3, 4, 5, and 6 provide various schematic views of an exemplary user device configured to commission an appliance according to an exemplary embodiment of the present disclosure.
Figure 4:
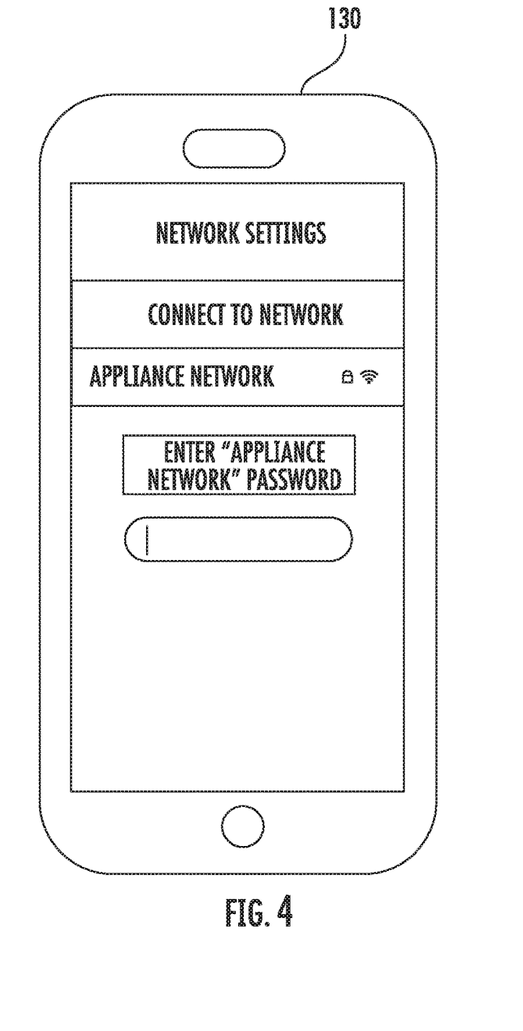

FIGS. 3, 4, 5, and 6 provide various schematic views of an exemplary user device configured to commission an appliance according to an exemplary embodiment of the present disclosure. As shown in FIG. 3, a user may provide various user inputs to display a Network Settings page or window of user device 130. The Network Settings page can display various Available Networks, including for example, Network 1, Home Network, Appliance Network, and Network 2. To commence commissioning the appliance, a user can select Appliance Network. Once the Appliance Network is selected, a user can be prompted to provide an Appliance Password as shown in FIG. 4. Upon correctly entering the Appliance Password, user device 130 becomes connected to the local Appliance Network. The Appliance Password may be provided on the appliance itself or with documents associated with the appliance.

Figure 5:
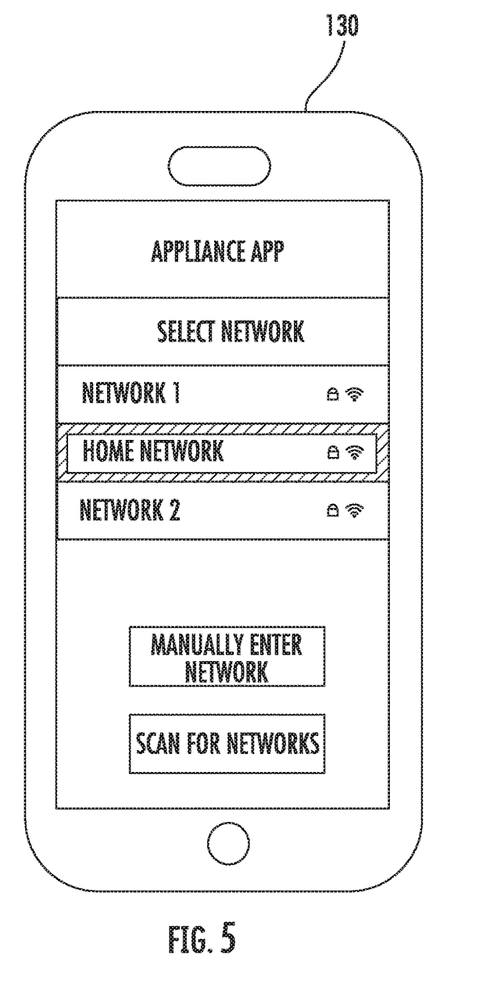
Figure 6:
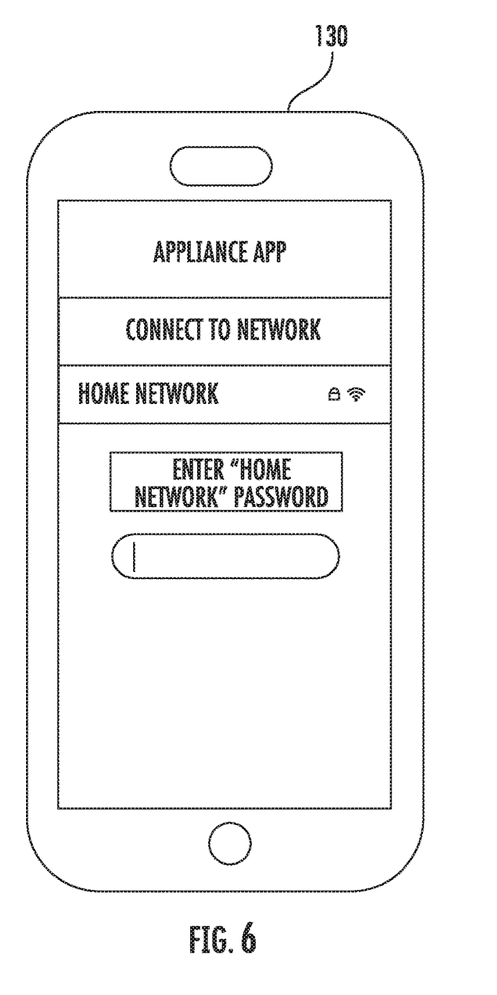

As shown in FIG. 5, once user device 130 is connected to local Appliance Network, user device 130 can be used to pass the credentials of a home local network to appliance. Particularly, a user can provide one or more inputs to display a Network Settings page or window of Appliance App. As shown, various networks are displayed, including Network 1, Home Network, and Network 2. A user can select Home Network from the detected networks list or may manually enter the network name or SSID so that the user can finish the commissioning process. As shown in FIG. 6, once the Home Network is selected, a user can be prompted to provide a Home Network Password. Upon correctly entering the Home Network Password, appliance 110 (FIG. 1) becomes connected to the Home Network, and accordingly, appliance 110 is fully commissioned and can be remotely controlled via Appliance App running on user device 130. Notably, as will be explained further below, data indicative of the geographic location of the user device can be obtained while the user device 130 is connected to the local Appliance Network during the commissioning process.

At (304), returning to FIG. 2, the method (300) includes obtaining, via the user device, data indicative of the geographic location of the connected user device. That is, when or upon user device 130 becoming connected with local appliance network 118 provided by appliance 110, user device 130 obtains data indicative of the geographic location (e.g., GPS coordinates) of user device 130. For instance, upon user device 130 making a connection to local appliance network 118 provided by appliance 110, location module 136 can be instructed by controller 132 of user device 130 to obtain data indicative of the geographic location of user device 130. In some implementations, user device 130 can connect to local appliance network 118 provided by appliance 110 during the commissioning process described above. Alternatively, a user can connect to local appliance network 118 at any suitable time.

At (306), method (300) includes providing, via the user device, the obtained data indicative of the geographic location of the connected user device to a remote computing device. For instance, once user device 130 obtains the data 140 indicative of the geographic location of the connected user device 130, the data 140 can be routed to remote computing device 160 via network 150. In some implementations, the obtained data 140 is stored in a memory device of controller 132 and routed at a later time to remote computing device 160, e.g., when user device 130 is disconnected from local appliance network. As one example, the data 140 can be provided to remote computing device 160 when user device 130 is connected to another network, such as e.g., a home wireless network.

Notably, the obtained data indicative of the geographic location of the connected user device is indicative of the geographic location of the appliance. As noted previously, as appliance network 118 is provided by appliance 110 as a local area network having a limited range or connectable radius, the data 140 indicative of the geographic location of user device 130 provided to remote computing device 160 is also indicative of the geographic location of appliance 110. That is, the data 140 indicative of the geographic location of user device 130 when user device 130 is connected to local appliance network 118 of appliance 110 is indicative of the geographic location of appliance 110. Accordingly, the data 140 indicative of the geographic location of user device 130 while connected to the local appliance network 118 is also indicative of the geographic location of appliance 110. As noted previously, knowing the geographic location of appliance 110 has many uses and benefits.

In some implementations, user device 130 can provide the data 140 to remote computing device 160 automatically. For instance, user device 130 can automatically push or send the data 140 upon user device 130 connecting to local appliance network 118 and user device 130 obtaining the data 140. In such implementations, it may be ensured that data 140 is routed to remote computing device 160 efficiently and human error is eliminated. In yet other implementations, user device 130 can provide the data 140 to remote computing device 160 upon user authorization.

Figure 7:
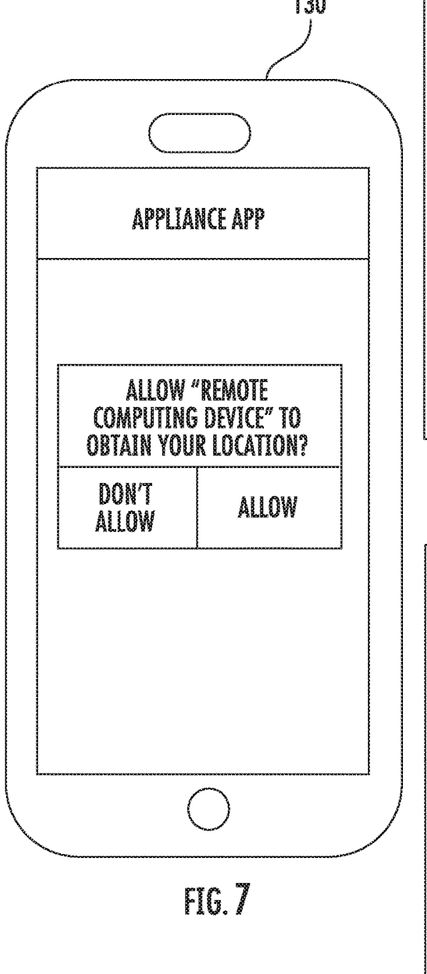
FIG. 7 provide a schematic view of an exemplary user device configured for prompting a user according to an exemplary embodiment of the present disclosure.

At (308), for instance, the method (300) can include prompting, by the user device, a user to permit the remote computing device to obtain the data indicative of the geographic location of the user device. By way of example, referring now to FIG. 7, the Appliance App can provide a page or window that prompts a user to decide whether to allow remote computing device 160 (FIG. 1) to access or otherwise obtain the data 140 (FIG. 1) indicative of the geographic location of user device 130. In this way, a user may be afforded their desired privacy.

At (310), in some implementations, prior to providing at (306), via the user device, the data indicative of the geographic location of the user device to the remote computing device at (306), the method (300) further includes validating, by the user device, the data indicative of the geographic location of the user device. In this way, user device 130 does not send invalid or incorrect information to remote computing device 160. For example, if the Application Programming Interface running on controller 132 of user device 130 cannot validate the data 140 obtained by location module 136, user device 130 does not provide data 140 at (306). In such implementations, the method (300) can further include generating, by the user device, a notification indicating that the data 140 indicative of the geographic location of the connected user device 130 is invalid and thus was not sent to remote computing device 160.

At (312), the method (300) can include receiving the provided data indicative of the geographic location of the connected user device. For instance, when user device 130 provides the obtained data 140 indicative of the geographic location of the connected user device 130 to remote computing device 160, remote computing device 160 receives the provided data. Remote computing device 160 can receive the data 140 in any suitable fashion.

Figure 8:
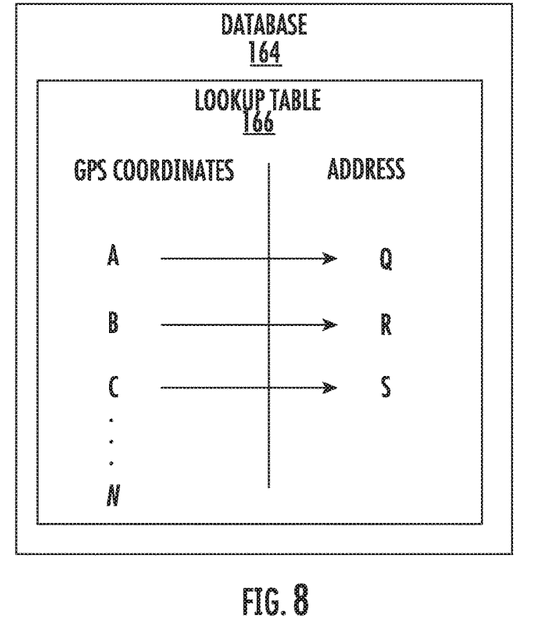
FIG. 8 provides an example lookup table of a database of a remote computing device of an exemplary system according to an exemplary embodiment of the present disclosure.

At (314), the method (300) can include performing a control action based at least in part on the received data. For instance, in some implementations, the control action performed at (314) can include determining, by the remote computing device, an address at which the appliance is located based at least in part on the received data indicative of the geographic location of the user device. As one example, with reference to FIGS. 1 and 8, remote computing device 160 includes a database 164. Database 164 includes a lookup table 166 that correlates GPS coordinates with physical addresses. For the depicted example, GPS coordinates "A" correspond with physical address "Q", GPS coordinates "B" correspond with physical address "R", and GPS coordinates "C" correspond with physical address "S", and so on and so forth to the Nth GPS coordinates. Accordingly, in determining the address at which the application is located, the received data 140 indicative of the geographic location (e.g., GPS coordinates) of user device 130, which is also indicative of the geographic location of the appliance, is correlated with an address via a lookup table 166 of database 164.

The determined address can be used to update a master register that correlates appliances with an address at which a particular appliance is located. Accordingly, in some implementations, the control action performed at (314) can further include updating, by the remote computing device, a master register with the determined address at which the appliance is located. For instance, with reference to FIGS. 1 and 9, database 164 includes a master register 168 that correlates various appliances with physical addresses. For the depicted example of FIG. 9, as shown, "Appliance 0001" corresponds with physical address "Q", "Appliance 0002" corresponds with physical address "R", "Appliance 0003" corresponds with physical address "5", and so on and so forth to the Nth appliance. Accordingly, after determining the address at which the appliance is located, master register 168 can be updated accordingly.

Figure 9:
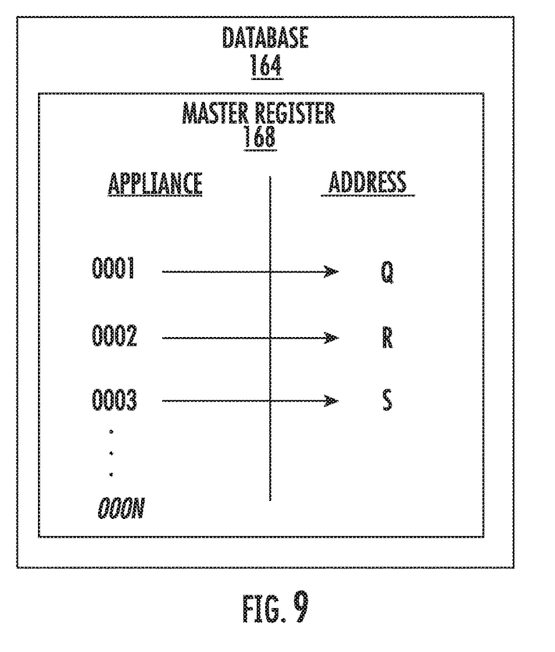
FIG. 9 provides an example master register of a database of a remote computing device of an exemplary system according to an exemplary embodiment of the present disclosure.

For instance, if the identity of the appliance is not recognized in the master register 168, a new entry can be created for the appliance and its associated address. In some implementations, if the identity of the appliance is recognized, the entry in the master register 168 can be updated with the determined address or added as a new line item such that two addresses are associated with the address. Accordingly, in some implementations, the method (300) can include ascertaining, by the remote computing device, whether the determined address is the same as a registered address associated with the appliance. Further, in some implementations, the method (300) can further include generating, by the remote computing device, a notification indicating whether the determined address is the same as the registered addressed associated with the appliance. As one example, if the determined address is the same as the registered addressed associated with the appliance, the notification can indicate that the determined address and the registered address are the same. This may, for example, provide a level of confidence that the user correctly previously registered their appliance. If, on the other hand, the determined address is not the same as the registered addressed associated with the appliance, the notification can indicate that the determined address and the registered address are not the same. The generated notification can be provided or displayed to a service professional when the consumer has contacted the manufacture to service the appliance associated with the determined address.

In some further implementations, the remote computing device can ascertain whether the determined address is associated with a predetermined number of appliances of the same type as the appliance (e.g., five or more appliances). Accordingly, the method (300) can include ascertaining, by the remote computing device, whether the determined address at which the appliance is located is associated with a predetermined number of appliances of the same type as the appliance. For instance, if the appliance is a refrigerator appliance, the remote computing device can ascertain whether the address associated with the refrigerator appliance already has a predetermined number of refrigerator appliances. In this way, the remote computing device can assume that the appliance is located in a multi-family or multi-resident building, such as e.g., an apartment building. Such information may be helpful for a service professional tasked with servicing a user's appliance. For example, if a specific apartment number is not listed in the master register 168 (FIGS. 1 and 9), a service professional will know to follow up with the user ahead of time to obtain the exact apartment number. Accordingly, in some implementation, the method (300) can include generating, by the remote computing device, a notification indicating whether the determined address at which the appliance is located is associated with the predetermined number of appliances of the same type as the appliance. For instance, the remote computing device can generate a notification and present the notification to a service professional tasked with servicing the appliance.

In alternative implementations, the remote computing device can ascertain whether the geographic location of the appliance (which is based at least in part on the received data indicative of the geographic location of the connected user device) is associated with a predetermined number of appliances of the same type as the appliance. A notification indicating whether the determined address at which the appliance is located is associated with the predetermined number of appliances of the same type as the appliance can be generated as well.

In some implementations, the appliance does not include a location module capable of determining the geographic location of the appliance. Indeed, in accordance with exemplary aspects of the present disclosure, the geographic location of the appliance can be determined or obtained by the method (300) set forth above. Accordingly, the appliance need not include location module or features that cannot obtain or are not capable of determining the geographic location of the appliance. In this way, the appliance need not include a relatively expensive location module onboard. Rather, an existing location module and existing network module on the appliance can be used in combination to route data indicative of the geographic location of the appliance to the remote computing device.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for obtaining a geographic location of an appliance, the method comprising:
    connecting a user device to a local appliance network provided by the appliance;
    obtaining, via the user device, data indicative of the geographic location of the connected user device;
    providing, via the user device, the obtained data indicative of the geographic location of the connected user device to a remote computing device, wherein the obtained data indicative of the geographic location of the connected user device is indicative of the geographic location of the appliance; and
    determining, by the remote computing device, an address at which the appliance is located based at least in part on the data indicative of the geographic location of the user device.

2. The method of claim 1, wherein the data indicative of the geographic location of the connected user device comprises GPS coordinates.

3. The method of claim 1, wherein the local appliance network provided by the appliance is a wireless network.

4. The method of claim 1, wherein the local appliance network provided by the appliance is a wired network.

5. The method of claim 1, further comprising:
    prompting, by the user device, a user to permit the user device to provide the data indicative of the geographic location of the user device to the remote computing device.

6. The method of claim 1, further comprising:
    updating, by the remote computing device, a master register with the determined address at which the appliance is located.

7. The method of claim 1, further comprising:
    ascertaining, by the remote computing device, whether the determined address is the same as a registered address associated with the appliance.

8. The method of claim 7, further comprising:
    generating a notification, by the remote computing device, indicating whether the determined address is the same as the registered addressed associated with the appliance.

9. The method of claim 1, further comprising:
    ascertaining, by the remote computing device, whether the determined address at which the appliance is located is associated with a predetermined number of appliances of the same type as the appliance; and
    generating a notification, by the remote computing device, indicating whether the determined address at which the appliance is located is associated with the predetermined number of appliances of the same type as the appliance.

10. The method of claim 1, wherein the local appliance network provided by the appliance is a wireless local area network having a range less than about 100 feet 30 meters) from the appliance.

11. The method of claim 1, wherein the appliance is one of a washing machine appliance, a dryer appliance, a microwave appliance, an oven appliance, a cooktop appliance, a range appliance, a water heater appliance, a dishwasher appliance, a refrigerator appliance, a freezer appliance, and icemaker appliance, and a kitchen hub cooking system.

12. The method of claim 1, wherein the appliance does not include a location module capable of determining the geographic location of the appliance.

13. The method of claim 1, wherein prior to providing, via the user device, the data indicative of the geographic location of the user device to the remote computing device, the method further comprises:
    validating, by the user device, the data indicative of the geographic location of the user device.

14. The method of claim 1, further comprising:
    commissioning, via the user device, the appliance to a home local network, wherein during commissioning, the user device obtains identification information indicating an identity of the appliance and an identity of a user of the appliance.

15. A system, comprising:
    an appliance having a network module for providing a local appliance network;
    a user device connected with the local appliance network, the user device having a location module for obtaining data indicative of a geographic location of the user device while the user device is connected to the local appliance network; and
    a remote computing device communicatively coupled with the user device, wherein the remote computing device receives, from the user device, the data indicative of the geographic location of the user device while the user device is connected to the local appliance network, wherein the user device validates the data indicative of the geographic location of the user device prior to providing the data to the remote computing device, and wherein the data indicative of the geographic location of the user device while the user device is connected to the local appliance network is indicative of a geographic location of the appliance.

16. The system of claim 15, wherein a range of the local appliance network is less than about 100 feet (≈30 meters).

17. The system of claim 15, wherein the location module of the user device is a global positioning system.

18. A method for obtaining a geographic location of an appliance, the method comprising:
   connecting a user device to a local appliance network provided by the appliance;
   obtaining, via the user device, data indicative of the geographic location of the connected user device;
   providing, via the user device, the obtained data indicative of the geographic location of the connected user device to a remote computing device, wherein the obtained data indicative of the geographic location of the connected user device is indicative of the geographic location of the appliance; and
   commissioning, via the user device, the appliance to a home local network, wherein during commissioning, the user device obtains identification information indicating an identity of the appliance and an identity of a user of the appliance.

19. The method of claim 18, wherein prior to providing, via the user device, the data indicative of the geographic location of the user device to the remote computing device, the method further comprises:
   validating, by the user device, the data indicative of the geographic location of the user device.

20. The method of claim 18, further comprising:
   determining, by the remote computing device, an address at which the appliance is located based at least in part on the data indicative of the geographic location of the user device.

* * * * *